(12) United States Patent
Domel et al.

(10) Patent No.: US 10,421,533 B2
(45) Date of Patent: Sep. 24, 2019

(54) PANELS COMPRISING UNEVEN EDGE PATTERNS FOR REDUCING BOUNDARY LAYER SEPARATION

(71) Applicant: Lockheed Martin Corporation, Bethesda, MD (US)

(72) Inventors: Neal David Domel, Aledo, TX (US); Dan Baruzzini, Palmdale, CA (US); Kent W. Benner, Fort Worth, TX (US); Richard Scott Ely, II, Hurst, TX (US); Daniel N. Miller, Bainbridge Island, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 88 days.

(21) Appl. No.: 14/934,818

(22) Filed: Nov. 6, 2015

(65) Prior Publication Data
US 2017/0129593 A1  May 11, 2017

(51) Int. Cl.
*B64C 21/10* (2006.01)
*B64C 3/14* (2006.01)
*B64C 23/06* (2006.01)

(52) U.S. Cl.
CPC .............. *B64C 21/10* (2013.01); *B64C 3/14* (2013.01); *B64C 23/06* (2013.01);
(Continued)

(58) Field of Classification Search
CPC .. B64C 3/14; B64C 3/58; B64C 21/10; B64C 23/06; B64C 2003/147; B64C 2230/26;
(Continued)

(56) References Cited

U.S. PATENT DOCUMENTS 2,800,291 A * 7/1957 Veryan ................... B62D 35/00
114/67 R
4,323,209 A 4/1982 Thompson
(Continued)

FOREIGN PATENT DOCUMENTS

| WO | WO 2011/004261 A1 | 1/2011 |
| WO | WO 2015/030573 A1 | 3/2015 |
| WO | WO 2015/198093 A1 | 12/2015 |

OTHER PUBLICATIONS

European Patent Office, Germany—Communication re: Extended European Search Report, pursuant to Rule 62 EPC, the EU search report (R.61 EPC) or the partial EU search report/declaration of no search (R.63 EPC) and the EU search opinion; Application No. 16197492.8-1754; Ref. EP109209GM, dated Apr. 7, 2017.
(Continued)

*Primary Examiner* — Richard R. Green
*Assistant Examiner* — Brady W Frazier
(74) *Attorney, Agent, or Firm* — Baker Botts L.L.P.

(57) ABSTRACT

In one embodiment, an airfoil includes a first end and a second end opposite the first end. The airfoil also includes a first side and a second side opposite the first side. The airfoil includes a continuous panel coupled to the first side of the airfoil. The continuous panel includes a first edge having a first uneven edge pattern. The first edge has at least four vertices disposed thereon. The continuous panel extends from the first end of the airfoil to a second end of the airfoil.

12 Claims, 5 Drawing Sheets

(52) U.S. Cl.
CPC .. *B64C 2003/147* (2013.01); *B64C 2003/148* (2013.01); *B64C 2230/26* (2013.01); *Y02T 50/12* (2013.01); *Y02T 50/166* (2013.01)

(58) Field of Classification Search
CPC . F05B 2240/122; Y02T 50/162; Y02T 50/166
USPC ....... 244/130, 198, 199.1, 199.2, 200, 200.1
See application file for complete search history.

(56) References Cited

U.S. PATENT DOCUMENTS

| | | | |
|---|---|---|---|
| 5,088,665 | A | 2/1992 | Vijgen et al. |
| 6,105,904 | A | 8/2000 | Lisy et al. |
| 6,431,498 | B1 | 8/2002 | Watts et al. |
| 6,837,465 | B2 * | 1/2005 | Lisy ................. B64C 23/06 244/204 |
| 7,114,685 | B1 | 10/2006 | Schulein |
| 8,414,261 | B2 | 4/2013 | Bonnet |
| 8,506,250 | B2 | 8/2013 | Bagepalli et al. |
| 9,133,816 | B2 * | 9/2015 | Jensen ................. F03D 1/0608 |
| 2008/0217484 | A1 * | 9/2008 | Bender ................. B64C 9/32 244/199.2 |
| 2009/0189023 | A1 * | 7/2009 | Mikulla ................. B64C 3/14 244/204 |
| 2011/0006165 | A1 | 1/2011 | Ireland |
| 2012/0257978 | A1 | 10/2012 | Jensen et al. |
| 2013/0299643 | A1 * | 11/2013 | Dorsett ................. B64C 23/06 244/199.2 |
| 2014/0328693 | A1 | 11/2014 | Wilson et al. |
| 2014/0334938 | A1 * | 11/2014 | Riddell ................. F03D 1/0633 416/236 R |
| 2016/0052621 | A1 * | 2/2016 | Ireland ................. B64C 21/04 137/13 |
| 2016/0215758 | A1 * | 7/2016 | Corten ................. B64C 23/06 |

OTHER PUBLICATIONS

Turbulators. http://web.archive.org/web/20030820163451/http://www.mh-aerotools.de/airfoils/turbulat.htm (downloaded Oct. 30, 2015).
European Patent Office, Germany—Communication pursuant to Article 94(3) EPC; Application No. 16197492.8-1754; OA dated Dec. 8, 2017.

* cited by examiner

PANELS COMPRISING UNEVEN EDGE PATTERNS FOR REDUCING BOUNDARY LAYER SEPARATION

TECHNICAL FIELD

This disclosure generally relates to panels disposed on wings for reducing adverse aerodynamic effects, and more specifically to panels comprising one or more uneven edges for reducing boundary layer separation.

BACKGROUND

A boundary layer may form around an airfoil, such as an aircraft wing, as air flows past the airfoil. The boundary layer may refer to the layer of air surrounding an airfoil surface in which air molecules flow slower than air molecules outside the boundary layer. This phenomenon occurs due to the viscosity of air molecules, which causes the air molecules at the airfoil surface to be virtually motionless relative to the airfoil. At lower airflow angles of attack, the boundary layer may remain attached to the aircraft wing. However, as angle-of-attack increases, the boundary layer surrounding the low pressure side of the airfoil (near the trailing edge of the airfoil) may separate from the airfoil surface, which may cause increased drag forces incident upon the airfoil.

SUMMARY OF PARTICULAR EMBODIMENTS

According to one embodiment, an airfoil includes a first side and a second side opposite the first side, and an apparatus coupled to the first side of the airfoil, the apparatus comprising a first edge having a first uneven edge pattern.

Technical advantages of certain embodiments may include providing reduced aerodynamic drag upon wings and/or reduced wake turbulence behind wings via reduction of wingtip vortices. Some embodiments may extend the operational flight envelope to include more aggressive conditions due to delayed separation and reduced drag. Furthermore, some embodiments may provide drag reduction systems that require less aircraft downtime than traditional drag reduction systems. Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Figure 1A:
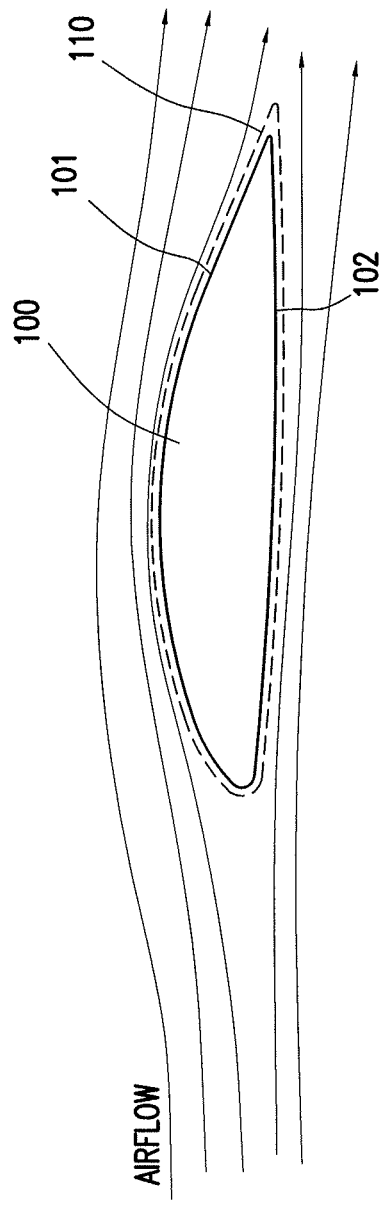
FIGS. 1A-1B illustrate an example airfoil without flow control encountering boundary layer separation due to high angle-of-attack.

Boundary layer separation for airfoils, such as aircraft wings, may cause a number of issues during flight, including increased drag forces incident upon the aircraft. Reducing or delaying boundary layer separation thus may improve performance of the airfoil by lowering drag and improving the lift characteristics through a range of angles of attack. Airfoil stall may also be delayed as well.

One method of reducing or delaying boundary layer separation involves the use of vortex generators installed on the low pressure side of an airfoil. Vortex generators may refer to devices which redirect airflow on or near an aerodynamic surface by introducing small streamwise vortices into the flow of air. Certain vortex generators small enough to be fully submerged or contained within the boundary layer may be referred to as micro-vortex generators. Because the boundary layer thickness may be small relative to the airfoil length and width, however, micro-vortex generators must be small and grouped in large numbers to have a desired effect. Accordingly, micro-vortex generators may be expensive and difficult to install securely to an airfoil. A typical mounting platform with straight edges may simplify installation of these devices, but may also introduce unwanted aerodynamic features that are detrimental to the performance of the airfoil.

Accordingly, aspects of the present disclosure may including panels comprising one or more uneven edge patterns, such as a zigzag pattern, on the leading and/or trailing edges of the panel. The uneven edge patterns may prevent, reduce, or delay boundary layer separation by introducing tiny streamwise vortices into the boundary layer (similar to vortex generators) to redistribute the momentum of the airflow. Thus, a panel with one or more uneven edge patterns according to the present disclosure may have a similar effect as vortex generators. However, in certain embodiments, the panel may further include one or more vortex generators (e.g., micro-vortex generators or micro-vanes) coupled to a top surface of the panel, which may further prevent, reduce, or delay boundary layer separation beyond the panel itself.

The panels according to the present disclosure may be composed of any suitable material for use on the exterior of an aircraft, such as aluminum, titanium, polymer or reinforced polymer material, or composite material. In certain embodiments, the panels may be arranged or oriented on the wing of an aircraft in such a way that maximizes the drag reduction for the particular aircraft design on which the array is installed. For example, the arrangement and/or orientation of panels for the wings of a relatively small aircraft may be different than those for the wings of a relatively large aircraft. In addition, the design or placement of the panels may be used in conjunction with other aerodynamic features such as winglets. Furthermore, in some embodiments, the panels may include one or more markings indicating proper alignment of the panels during installation on the wing. For example, lines or dots may be included on the panels that correspond to particular features of a wing, allowing an installer to properly align the panel during installation by aligning the markings with the corresponding features of the wing. Examples of wing features that can be used to align the panels include skin seams, rivet lines and other obvious wing features. The panels may be coupled to any suitable portion of the aircraft, including without limitation the low pressure side of a wing on the aircraft (e.g., the top side of a wing).

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 3, where like numbers are used to indicate like and corresponding parts. Although embodiments of the present disclosure are illustrated with respect to wings and aircraft, it will be understood that the teachings of the present disclosure may be applied to any suitable vehicle with panels that create vortices, such as watercraft, in order to increase the vehicle's efficiency.

Figure 1B:
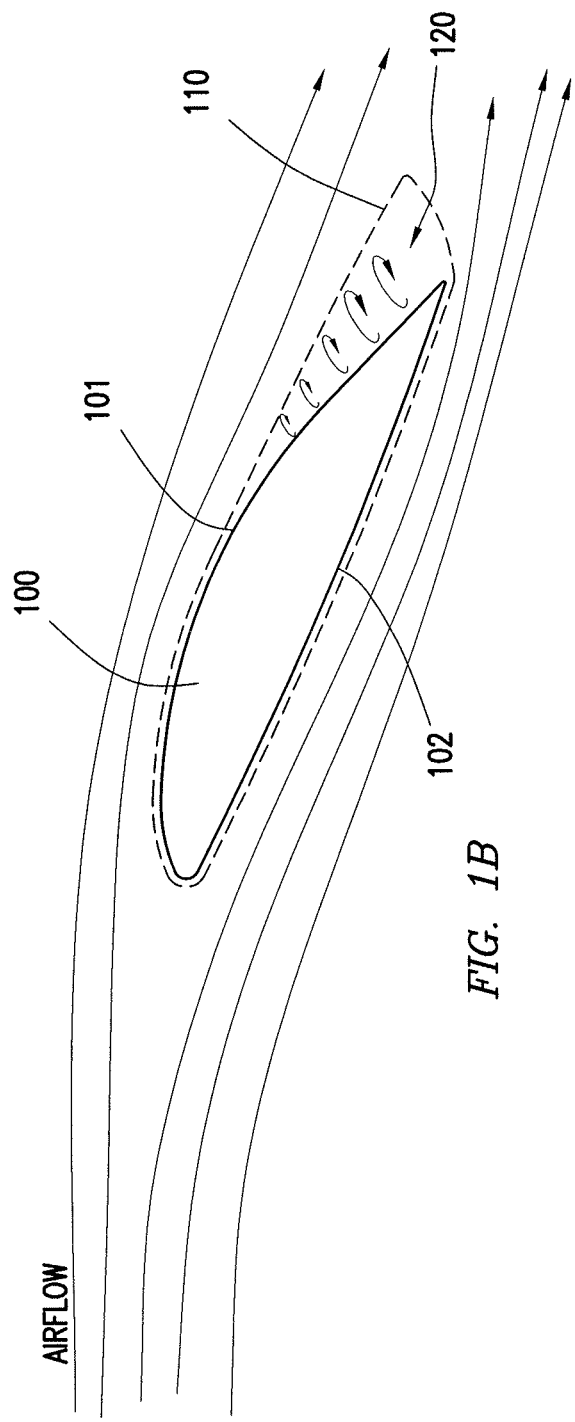

FIGS. 1A-1B illustrate an example airfoil 100 without flow control encountering boundary layer separation due to high angle-of-attack. More particularly, FIG. 1A illustrates airfoil 100 without separation of the boundary layer 110, while FIG. 1B illustrates airfoil 100 with separation of the boundary layer 110. Airfoil 100 comprises a low pressure surface 101 and a high pressure surface 102. As air flows past airfoil 100, the air flowing atop airfoil 100 may have a lower relative pressure while the air flowing below airfoil 100 may experience a higher relative pressure, creating a lift force on airfoil 100. Boundary layer 110 may form around airfoil 100 as air flows past airfoil 100. Boundary layer 110 may refer to the layer of air surrounding the surface of airfoil 100 in which air molecules flow slower than air molecules outside the boundary layer. This phenomenon occurs due to the viscosity of air molecules, which causes the air molecules at the airfoil surface to be virtually motionless relative to the airfoil. At lower airflow angles-of-attack, boundary layer 110 may remain attached to the airfoil 100, as illustrated in FIG. 1A. However, as angle-of-attack increases, boundary layer 110 surrounding the low pressure surface 101 of airfoil 100 (especially near the trailing edge of the airfoil) may separate, as illustrated in FIG. 1B. This separation may cause a number of adverse aerodynamic effects, such as increased turbulent flow 120 along the surface of airfoil 100, which may cause stall and increased drag forces incident upon airfoil 100.

Modifications, additions, or omissions may be made to FIGS. 1A-1B without departing from the scope of the present disclosure. For example, the design of airfoil 100 and the size/shape of boundary layer 110 may differ, but the principles illustrated and discussed herein may not change. As one example, it will be understood that aspects of the present disclosure may be used in embodiments with symmetric airfoils that have the same or substantially similar pressure on both sides of the airfoil, rather than a high pressure and a low pressure side as described above.

Furthermore, though FIG. 1B illustrates an example of boundary layer separation occurring on one side of airfoil 100 at a relatively high angle-of-attack, boundary layer separation may occur on either side of airfoil 100, and may occur at a relatively low (or zero) angle-of-attack. It will be understood that aspects of the present disclosure may apply to any of these situations.

Figure 2A:
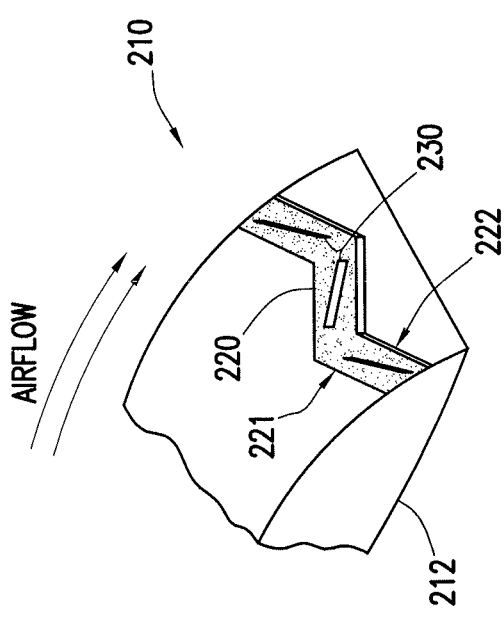
FIGS. 2A-2C illustrate perspective views of an example airfoil comprising panels with uneven edge patterns according to embodiments of the present disclosure.
Figure 2B:
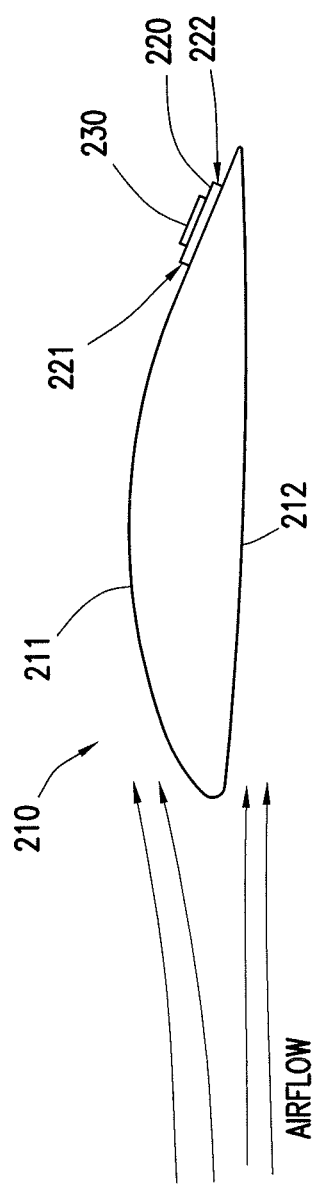
Figure 2C:
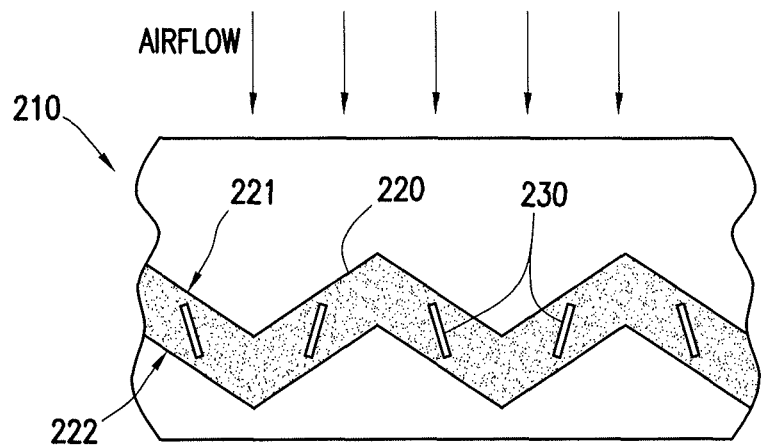

FIGS. 2A-2C illustrate perspective views of an example airfoil 210 comprising panels with uneven edge patterns according to embodiments of the present disclosure. Panels 220 may be of any suitable size, and may be oriented in any suitable way on airfoil 210. In certain embodiments, the design (including size, shape, orientation, position relative to the wing) of panels 220 may be optimized for particular aircraft and/or speeds of airflow. For example, the design of panels 220 may be optimized for cruising speeds of a particular type of aircraft (e.g., the average speed at which the type of aircraft flies between takeoff and landing) on which the panels 220 are to be installed in order to maximize drag reduction. As another example, the design of panels 220 may be optimized for non-cruising speeds (e.g., landing/takeoff speeds) or angles of attack (e.g., flap extension angles) that tend to create or greatly enhance boundary layer separation.

Panels 220 may be composed of any suitable materials for use on a wing, including rigid and/or lightweight materials such as aluminum, titanium, polymer or reinforced polymer materials, or composite materials. On one surface (e.g., the side coupled to airfoil 210), panels 220 may comprise an adhesive suitable for coupling the panel 220 to airfoil 210, such as an epoxy adhesive that can withstand high velocities and many different weather conditions. Panels 220 may be coupled to the low pressure surface 211 of airfoil 210, which may be opposite the high pressure surface 212 of airfoil 210. Low pressure surface 211 may refer to the side of airfoil 210 that encounters lower relative pressure when air flows past airfoil 210, while high pressure surface 212 may refer to side of airfoil 210 that encounters higher relative pressure when air flows past airfoil 210.

Figure 3A:
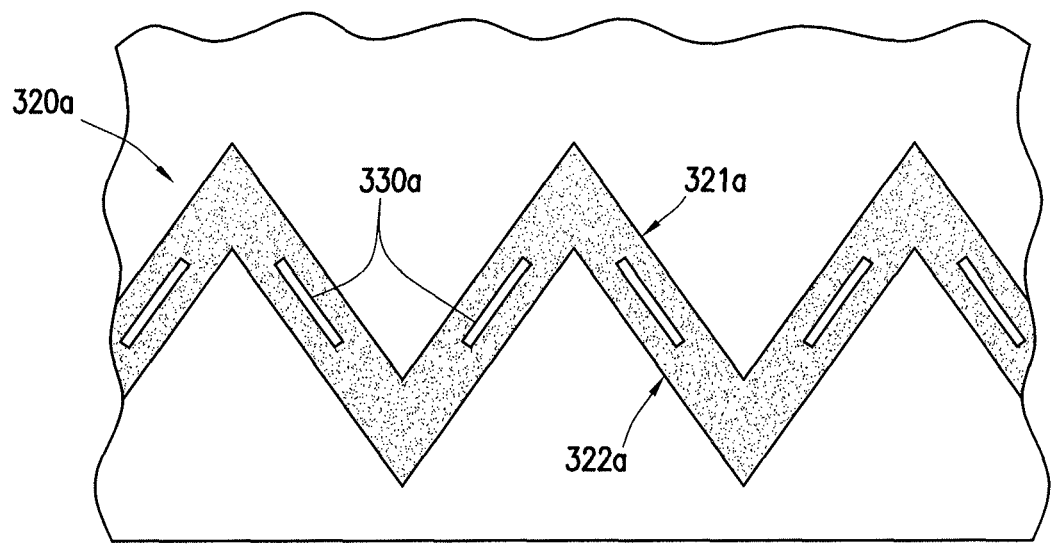
FIGS. 3A-3C illustrate example embodiments of panels with uneven edge patterns according to embodiments of the present disclosure.
Figure 3B:
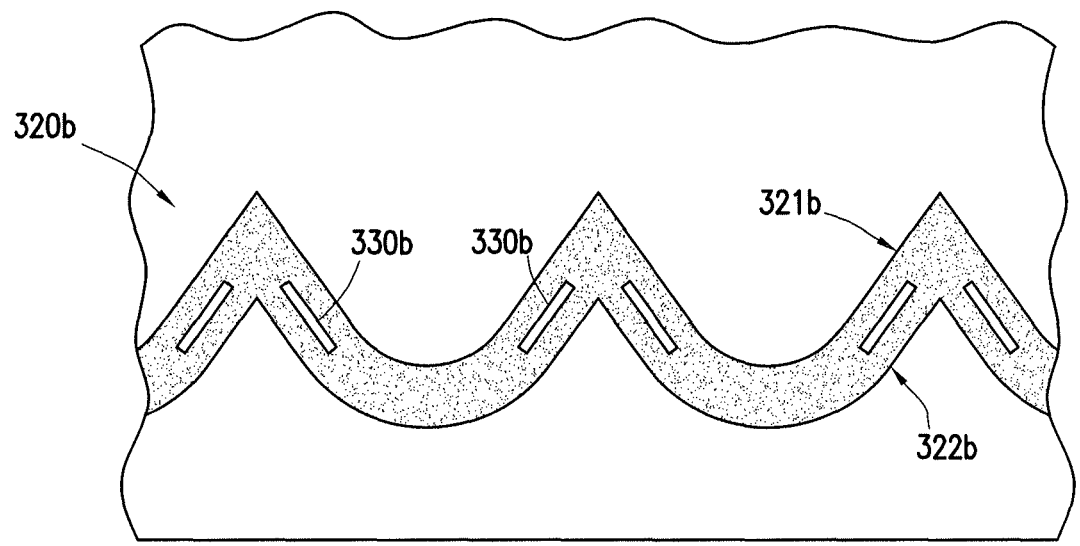

Panels 220 may comprise a leading edge 221 and trailing edge 222. Leading edge 221 may refer to the edge of panel 220 facing generally against the airflow, while trailing edge 222 may refer to the edge of panel 220 facing in the same general direction as the airflow. One or both of leading edge 221 and trailing edge 222 may have an uneven edge pattern, such as those illustrated in FIGS. 2A-2C. The uneven edge patterns may have any suitable pattern. For example, in some embodiments, the uneven edge pattern may include a zigzag (or serrated sawtooth-like) pattern, as illustrated in FIG. 3A. In other embodiments, the uneven edge pattern may include a wavy pattern, as illustrated in FIG. 3B. The uneven edge patterns of panels 220 may disrupt or redirect the airflow in the boundary layer over airfoil 210 as described above, thereby preventing, reducing, or delaying boundary layer separation.

In particular embodiments, panels 220 may further comprise one or more vortex generators 230 coupled to a surface thereof. Vortex generators 230 may be any suitable structure that redirects airflow on or near the surface of panels 220 and airfoil 210 by introducing small vortices into the flow of air. In some embodiments, vortex generators 230 may include micro-vortex generators or microvanes. Vortex generators 230 may be coupled to any suitable surface of panels 220, and may be coupled to the top surface of panel 220 (opposite the surface of panel 220 that is coupled to airfoil 210). In certain embodiments, the height of vortex generators 230 may be less than the thickness of the boundary layer. As an example, the height of vortex generators 230 may be within the range of 0.2-0.5 inches if the attached boundary layer height is about 1 inch. The shape of vortex generators 230 may be any suitable shape, such as trapezoidal or rectangular. Vortex generators 230 may be oriented at an angle of approximately normal to the surface of panel 220 on which it is disposed. However, in certain embodiments, vortex generators 230 may be oriented at non-normal angles relative to the surface of panel 220 on which it is disposed, such as at 30 or 45 degrees relative to the axis normal to the surface.

In particular embodiments (as illustrated in FIGS. 2A-2C), vortex generators 230 may be oriented at an angle that is different from the relative angles of the uneven edge patterns of panel 220. For example, relative angle of the uneven edge pattern with respect to the airflow may be approximately 60 degrees, while the relative angle of the vortex generators 230 with respect to the airflow may be approximately 30 degrees. In other embodiments, however, the angle at which vortex generators 230 are oriented may be the same as the relative angles of the uneven edge patterns of panel 220.

Modifications, additions, or omissions may be made to FIGS. 2A-2C without departing from the scope of the present disclosure. For example, although illustrated as having zigzag edge patterns, one or both of the leading edge 221 or trailing edge 222 of panels 220 may have a wavy edge pattern. As another example, although illustrated with both leading edge 221 and trailing edge 222 comprising uneven edge patterns, only one of leading edge 221 or trailing edge 222 of panels 220 may have an uneven edge pattern.

Figure 3C:
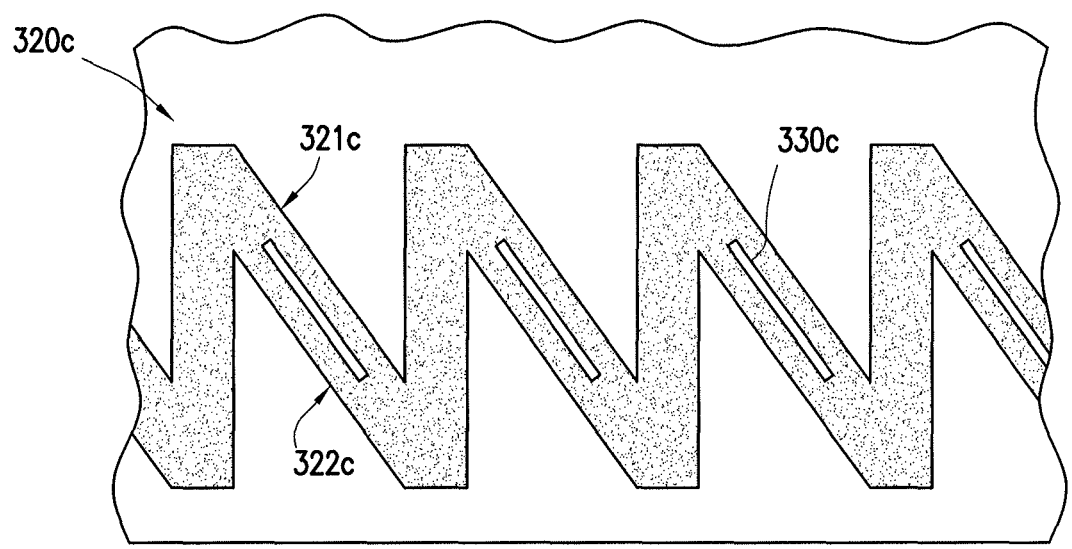

FIGS. 3A-3C illustrate example embodiments of panels 320 with uneven edge patterns according to embodiments of the present disclosure. In particular, FIG. 3A illustrates an example panel 320a with leading edge 321a and trailing edge 322a having a zigzag (also known as a "sawtooth" or "W" shaped pattern) with no curved portions. FIG. 3B illustrates an example panel 320b with leading edge 321b and trailing edge 322b having a wavy pattern with curved portions. FIG. 3C illustrates an example panel 320c with leading edge 321c and trailing edge 322c having an alternate zigzag pattern (also known as an "N" shaped pattern).

Edges 321-322 may be symmetric or asymmetric, which may depend on the design of panels 320. Symmetric edge patterns may produce pairs of vortices that rotate oppositely from one another, and may serve to delay separation and extend the attached boundary layer toward the rear of the airfoil. As an example, panels 320a-320b of FIGS. 3A-3B comprise symmetric patterns of edges 321a-b and 322a-b. Asymmetric edge patterns, on the other hand, may produce pairs of vortices that co-rotate (wherein one may be stronger than the other), and may serve to divert the boundary layer to one side of the airfoil.

Panels 320 comprise vortex generators 330. Vortex generators 330 may be oriented at substantially the same angle (relative to the airflow) as edges 321-322 of panels 320, as illustrated in FIGS. 3A-3C. For instance, the angle of vortex generators 330, leading edge 321, and trailing edge 322 may be approximately 60 degrees relative to the airflow. However, in some embodiments, vortex generators 330 may be oriented at a different angle (relative to the airflow) than edges 321-322 of panels 320 (e.g., as illustrated in FIG. 2C). For instance, the angle of vortex generators 330 relative to the airflow may be approximately 30 degrees, while the angle of leading edge 321 and/or trailing edge 322 may be approximately 60 degrees.

Modifications, additions, or omissions may be made to FIGS. 3A-3C without departing from the scope of the present disclosure. For example, the angles of the patterns of edges 321-322 and/or vortex generators 330 may differ from those illustrated.

Figure 4:
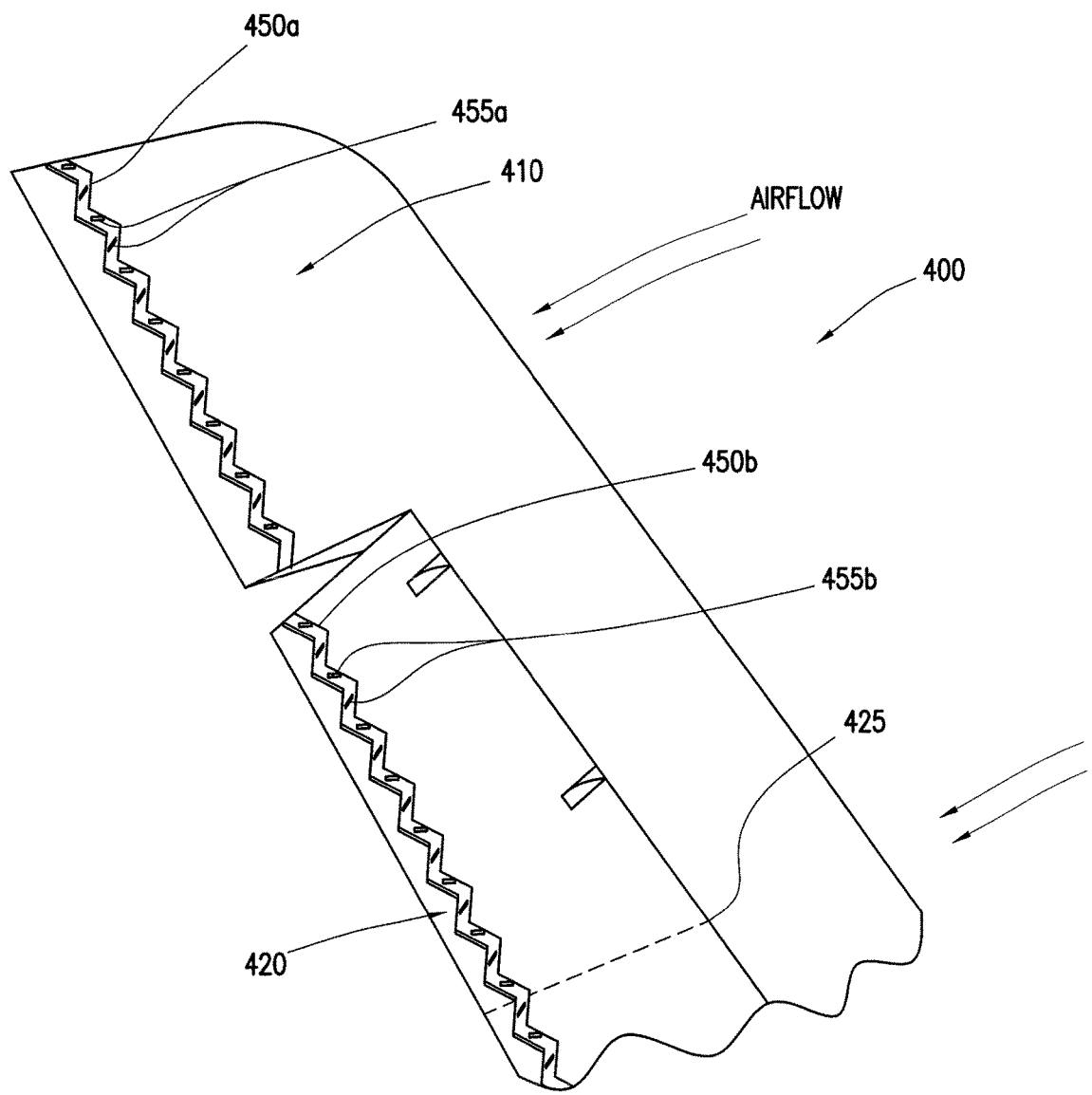
FIG. 4 illustrates an example aircraft wing comprising panels with uneven edge patterns according to embodiments of the present disclosure.

FIG. 4 illustrates an example aircraft wing 400 comprising panels 450 with uneven edge patterns, according to embodiments of the present disclosure. Wing 400 comprises a body portion 410 and a flap 420. Wing 400 may also comprise, in certain embodiments, an aileron (not shown) in one or more locations. Panels 450 may be located on any suitable surface of wing 400, such as on one or more areas of body portion 410 and/or flap 420. In certain embodiments, the precise placement of panels 450 on wing 400 may be based on the specific wing application, such as the model of aircraft on which panels 450 are installed. Panels 450 may be a constituent portion of wing 200 (e.g., formed into the skin of wing 400), or may be a separate component coupled to wing 400 as shown in FIG. 4.

In certain embodiments, panels 450 may comprise one or more vortex generators 455 coupled to a surface thereof, similar to panels 220 of FIGS. 2A-2C. Vortex generators 455 may be any suitable vortex generator device, and may include micro-vortex generators in certain embodiments. In particular embodiments, panels 450 may also comprise one or more markings (e.g., lines, not shown) that may indicate proper placement of panels 450 on wing 400. For example, the markings may indicate alignment with respect to one or more of the features of wing 400, such as skin seams 425 of wing 400 as illustrated in FIG. 4.

In particular embodiments, the design of certain panels 450 on wing 400 may differ from other panels 450 on wing 400. For instance, one or more aspects of the design of panels 450a (e.g., thickness or angles of the uneven edge patterns relative to the airflow) located on body portion 410 of wing 400 may different from the design of panels 450b located on flap 420. Likewise, one or more aspects of the design of vortex generators 455a (e.g., the shape or angle relative to the airflow) may be different from the design of vortex generators 455b on flap 420.

Modifications, additions, or omissions may be made to FIG. 4 without departing from the scope of the present disclosure. For example, the design of wing 400, including but not limited to the design of flaps 420, may differ depending on the aircraft on which panels 450 are installed. As another example, although illustrated as being disposed on both body portion 410 and flap 420, panels 450 may be disposed only on body portion 210 or only on flap 400. As yet another example, although illustrated as being disposed across the entire body portion 410 and flap 420, panels 450 may be disposed only on portions thereof. As yet another example, although illustrated as being disposed on one panel of panels 450, vortex generators 455 may be disposed on any suitable portion or the entirety of panels 450. As yet another example, vortex generators 455 (such as microvanes) may be omitted completely if the serrated panels provide sufficient flow control by themselves.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An airfoil, comprising:
   an inboard end and an outboard end opposite the inboard end;
   a first side and a second side opposite the first side;
   a continuous panel coupled to the first side of the airfoil, the first side being a low pressure side of the airfoil, the continuous panel comprising a first edge having a first uneven edge pattern, the first edge having at least four vertices disposed thereon, the continuous panel extending from the inboard end of the airfoil to the outboard end of the airfoil; and
   wherein the continuous panel further comprises one or more vortex generators coupled to a surface of the continuous panel and evenly distributed along the length of the continuous panel.

2. The airfoil of claim 1, wherein the first uneven edge pattern is symmetric.

3. The airfoil of claim 1, wherein the first uneven edge pattern is asymmetric.

4. The airfoil of claim 1, wherein the first uneven edge pattern is a zigzag pattern.

5. The airfoil of claim 1, wherein the first uneven edge pattern is a wavy pattern.

6. The airfoil of claim 1, wherein the continuous panel further comprises a second edge having a second uneven edge pattern.

7. The airfoil of claim 6, wherein the first uneven edge pattern is the same as the second uneven edge pattern.

8. The airfoil of claim 1, wherein the one or more vortex generators are oriented at substantially the same angle as the first uneven edge pattern.

9. The airfoil of claim 1, wherein the one or more vortex generators are oriented at a different angle than the first uneven edge pattern.

10. The airfoil of claim 1, wherein at least one of the one or more vortex generators is trapezoidal.

11. The airfoil of claim 1, wherein at least one of the one or more vortex generators is rectangular.

12. A wing, comprising:
    an inboard end of the wing and an outboard end of the wing opposite the inboard end;
    a low pressure side and a high pressure side opposite the low pressure side, wherein the low pressure side and high pressure side are formed in a way that generates a net force into the high pressure side when air flows past the low pressure side and the high pressure side; and
    a continuous panel coupled to the low pressure side of the wing, the continuous panel comprising:
    a first edge having a first uneven edge pattern;
    a second edge having a second uneven edge pattern;
    one or more vortex generators coupled to a surface of the continuous panel;
    the first edge having at least four vertices disposed wherein, the continuous panel extends from the inboard end of the wing to the outboard end of the wing; and
    wherein the continuous panel further comprises one or more vortex venerators coupled to a surface of the continuous panel and evenly distributed along the length of the continuous panel.

* * * * *